Sept. 30, 1958   J. W. BALLARD ET AL   2,853,801
AIRCRAFT GUIDANCE SYSTEM FOR TRAINERS
Filed Sept. 28, 1953   7 Sheets-Sheet 7

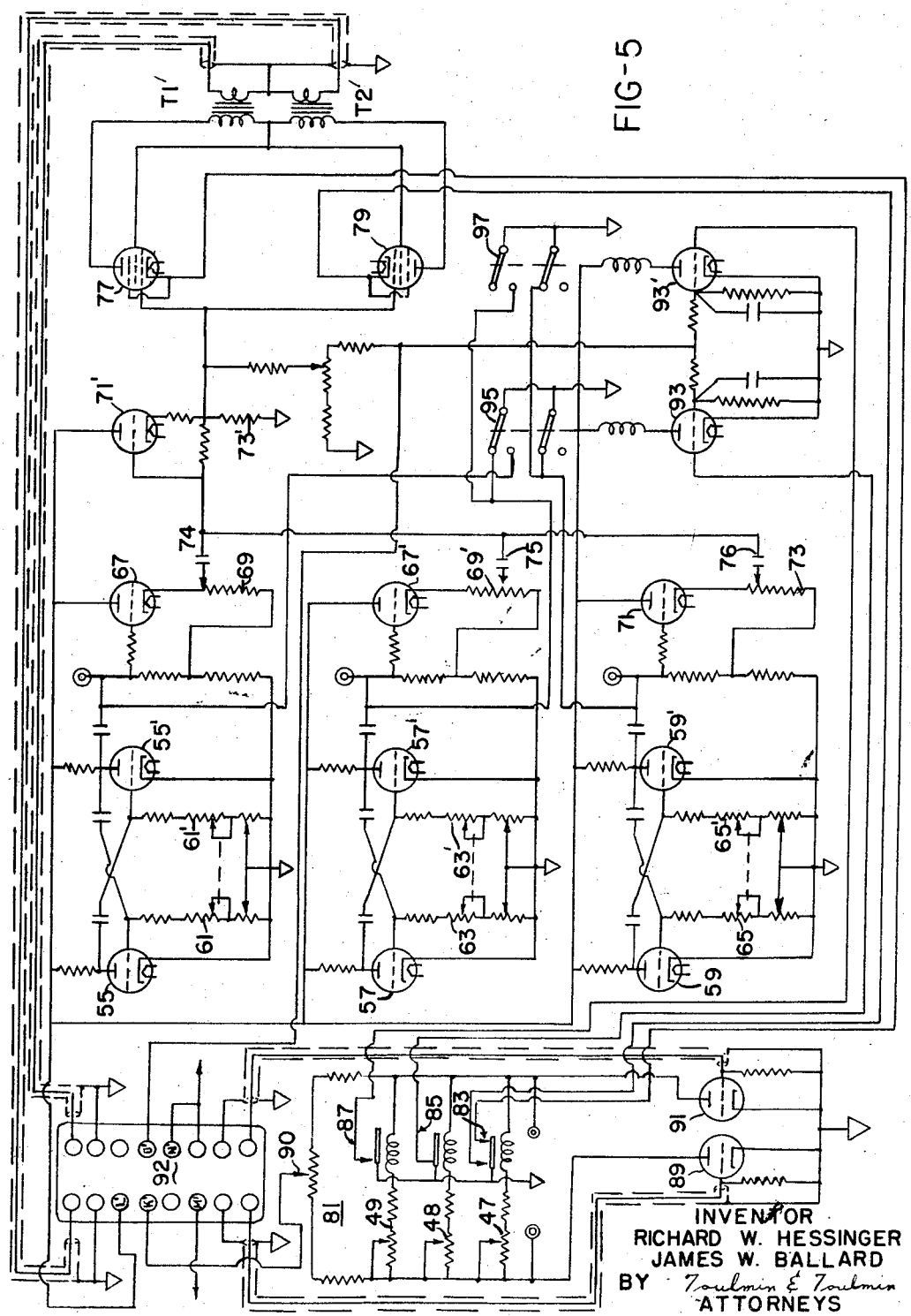

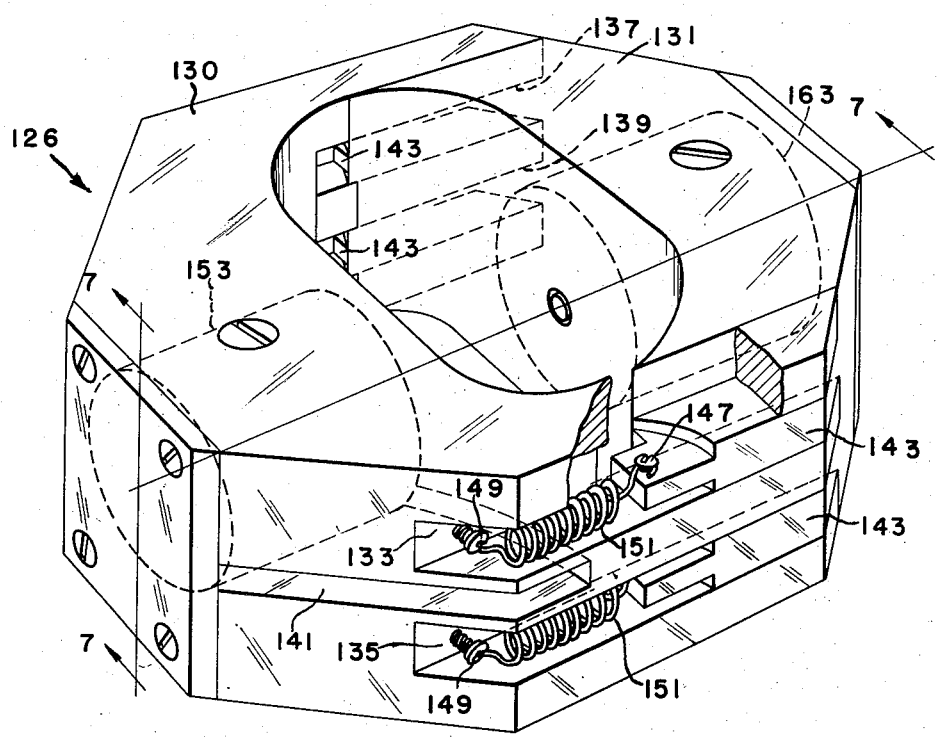

INVENTOR.
RICHARD W. HESSINGER
JAMES W. BALLARD
BY
ATTORNEYS

United States Patent Office 2,853,801
Patented Sept. 30, 1958

2,853,801

AIRCRAFT GUIDANCE SYSTEM FOR TRAINERS

James W. Ballard and Richard W. Hessinger, Dayton, Ohio, assignors to The Commonwealth Engineering Company of Ohio, Dayton, Ohio, a corporation of Ohio Application September 28, 1953, Serial No. 382,823

7 Claims. (Cl. 35—12)

This invention relates to apparatus and methods useful in the guiding of aircraft and in the training of aircraft pilots.

Pilot training is very frequently achieved with material aid from ground training mechanism such as the Link trainer. It is a primary object of this invention to describe apparatus and methods useful in conjunction with such training.

It is a particular object of this invention to describe a novel unit adapted to be worn on the thumb of an airplane pilot and which unit is actuable to signal to the pilot deviations from a predetermined flight pattern.

It is an important object of this invention to describe a novel thumb unit to be worn by a pilot and which is so actuable as to react psychologically on the pilot to induce automatic corrective actions by the pilot when the plane or trainer deviates or is caused to deviate from a predetermined pattern.

It is a further object of this invention to provide a system for correction of flight deviations which system provides a warning signal which increases in intensity with the magnitude of deviation from a predetermined flight routine.

The arrangement of invention, broadly speaking, comprises an assembly to be worn on the thumb of a pilot or of a pilot trainee under instructions in, for example, the well known Link trainer.

The thumb assembly incorporates a thumb agitator or contactor and a system is provided for effecting actuation of the agitator to cause the same to repetitively strike against the thumb of the wearer. These repetitive impulses are arranged to occur in response to deviations from a preconceived flight plan and the frequency of the impulse is preferably varied, that is, is increased as the deviation from the preconceived plan increases.

The thumb assembly is preferably comprised of small light weight shafts which are reciprocally movable with respect to the thumb of the pilot; the shafts are carried oppositely disposed on a centrally bored housing or housings. The housing is adapted to receive the thumb of the pilot in the bore thereof and the shafts which are the agitators or contactors referred to hereinbefore will then contact the thumb on opposite sides thereof.

In practice, as will be noted with particularity hereinafter, two housings are preferably employed. The contactors of each housing are adapted to engage specific portions of the thumb in order to induce in a pilot or trainee definite psychological reactions. Thus an upper contactor of a first housing is arranged to strike the thumb of the pilot directly behind the finger nail and the lower contactor of the housing just forward of the first joint of the thumb. This first housing then would have a small shaft thereof actuated when the deviation from the predetermined course is in a vertical direction; if the corrective measure to be taken is in a downward direction the upper shaft is pulsed which will cause the pilot substantially involuntarily or automatically to move away from the pulse shaft; and thus moving the plane controls to cause the plane itself or the training mechanism to move in a downward direction. Further, if in the case of an airplane, the plane has, due to natural or other causes, moved downwardly from its predetermined course the lower shaft of the first unit will be set into actuation and the automatic response of the pilot will be to pull the plane upwardly.

The moving shafts of the second housing function in a somewhat similar manner but are engageable on opposite sides of the thumb between the first and second joints. A deviation in course to the right would cause the shaft on the right side to function inducing the pilot to automatically make the proper corrective action by turning the plane to the left.

It is not vital that the mechanism of invention function precisely as described but preferred practice dictates that the psychological reactions be utilized in the effecting of the corrective actions.

The particular mode of developing the signal for the actuation of the thumb agitator or contactor is dependent upon the factor which is to be controlled. Under actual flight conditions control of altitude, for instance, may be initiated through a pressure responsive arrangement itself actuated by change in altitude; or, in the case of speed control a pressure responsive arrangement dependent upon a difference in the standard and dynamic pressures may be utilized; while the usual turn indicator of aircraft may have associated therewith equipment to permit the development of appropriate signals upon deviation from a prescribed course of turn. However the signal is initially developed in the practice of the invention, an unbalanced condition between the desired attitude of the equipment and the actual attitude is reflected in an electrical circuit which is utilized to control the application of power to the thumb agitator. As noted with particularity hereinafter this includes the utilization of an unbalanced electrical condition to control the actuation of a series of multi-vibrator circuits, each of which is capable of putting out a higher frequency than a preceding one, the determination as to which multi-vibrator action will be applied to the agitator being determined by the degree of electrical unbalance existing in a bridge circuit.

Preferably the frequency applied to the agitator increases as the degree of unbalance increases.

A particularly important feature of the preferred embodiment of the invention resides in the fact that the equipment may be arranged to provide no signal when the plane is on course and this is applicable whether the specific arrangement be designed for turn, altitude or speed, or whether it be for use in a Link trainer.

The invention will be more fully understood by reference to an arrangement for use in conjunction with the training of pilots as in a Link trainer, which arrangement is fully described in detail in connection with the accompanying drawing wherein:

Figure 5 is a schematic diagram illustrating the circuit of one of the electronic units;

Figure 6 is an enlarged perspective view of a thumb agitator assembly;

Figure 7 is a view taken on line 7—7 of Figure 6;

In the detailed description which follows the mechanism and operation are described only with particular reference to the bank control, that is the turn control, as the structure and mode of operation are similar for other controls in the apparatus of invention except for the arrangement of the thumb agitator assembly on the thumb of the trainee. With regard to the latter the position of contact of the agitator or shaft is altered with the kind of intelligence to be transmitted to the instruments.

Figure 1:
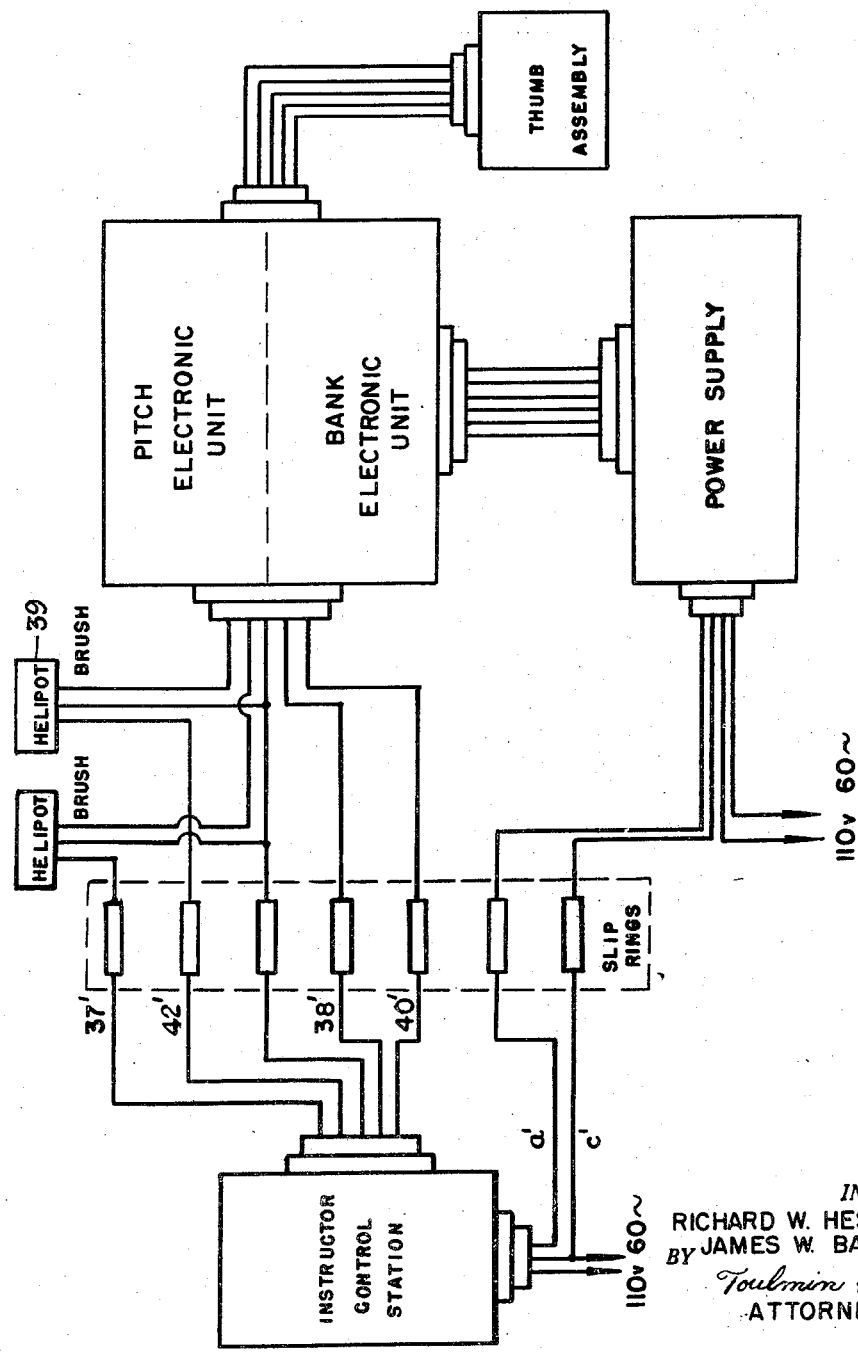
Figure 1 is a block diagram of an arrangement for use in conjunction with pilot training as in the Link trainer.
Figure 2:
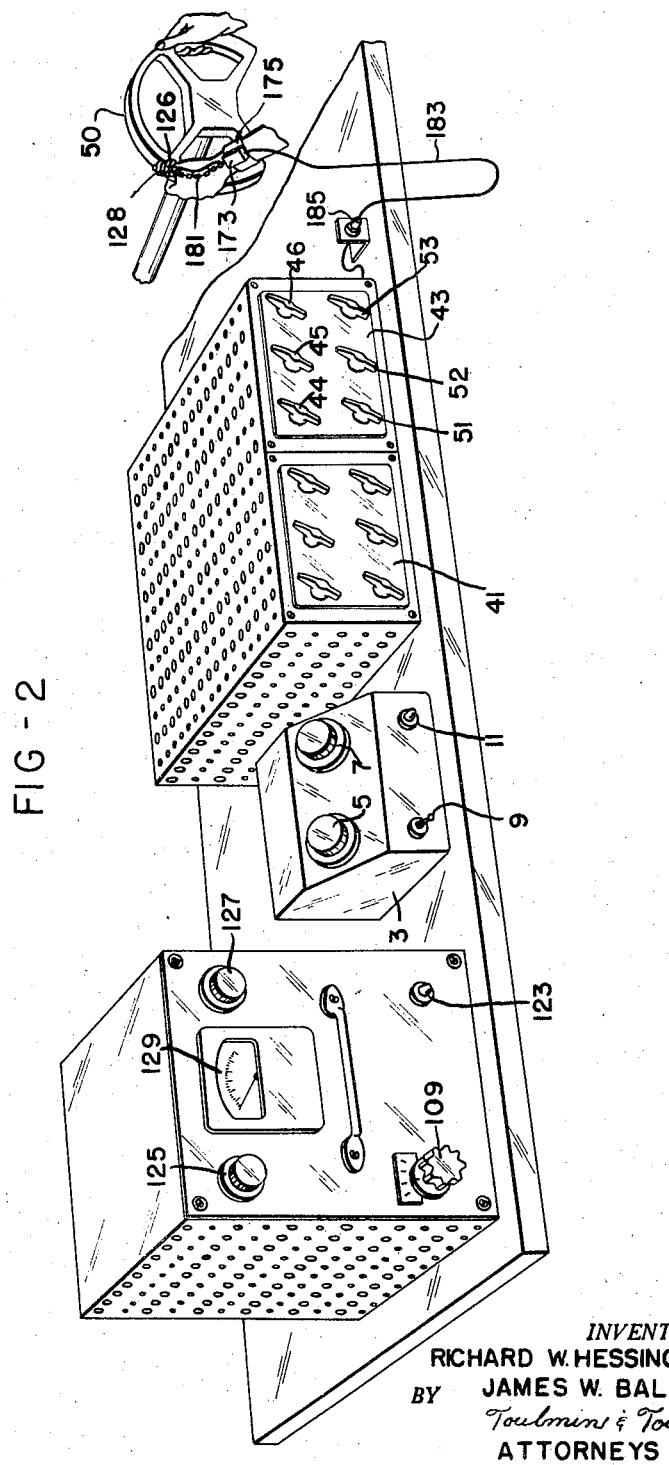
Figure 2 illustrates the arrangement of the major components of the apparatus indicated in Figure 1 and includes a showing of control mechanism adapted to be operated by a pilot trainee.
Figure 3:
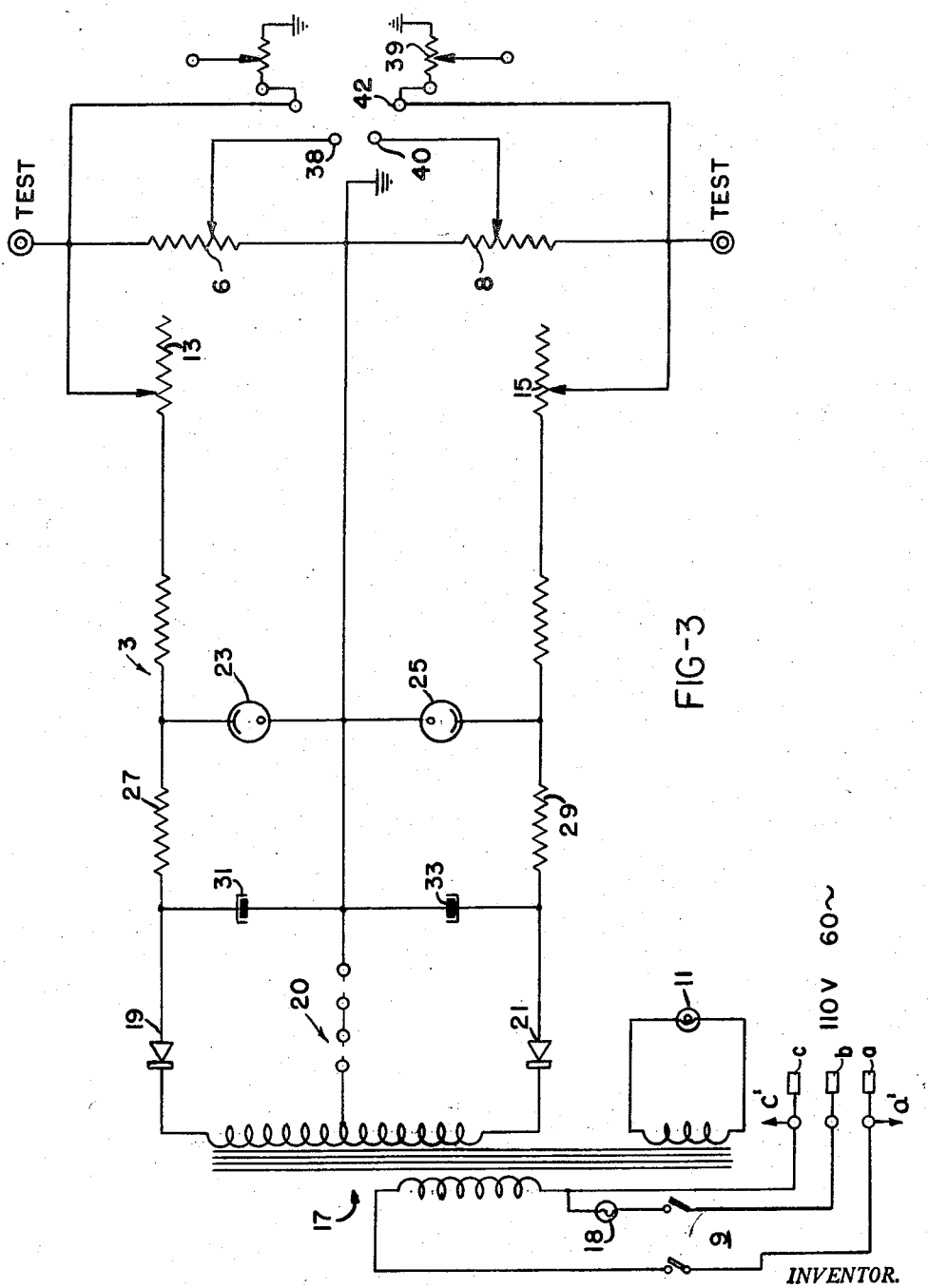
Figure 3 is a schematic diagram illustrating the circuit arrangement of the instructor control station of Figure 1.

Referring now particularly to Figures 1, 2 and 3 the instructor control station 3 is provided with a pair of dials 5, 7 the first of which is a pitch control and the second of which is the bank control. The master on-off switch 9 governs the flow of power to the whole arrangement and illumination of dial lamp 11 indicates the presence of power.

The instructor control station is supplied 110 volt 60 cycle power and has two prime functions the first of which is to control and the second of which is to permit the application of power to the power supply—this is accomplished by supplying 110 volt 60 cycle power through leads a', c' (Figure 3) and slip rings (Figure 1) to contact points A', C' on terminal board 14 of the power supply; the contacts A', C' are electrically connected to coil 16 of relay 22 which upon energization permits 110 volt 60 cycle (Figure 1) power to be supplied through D', E' and the relay to the power supply transformers T1, T2, T3 and T4.

Figure 8:
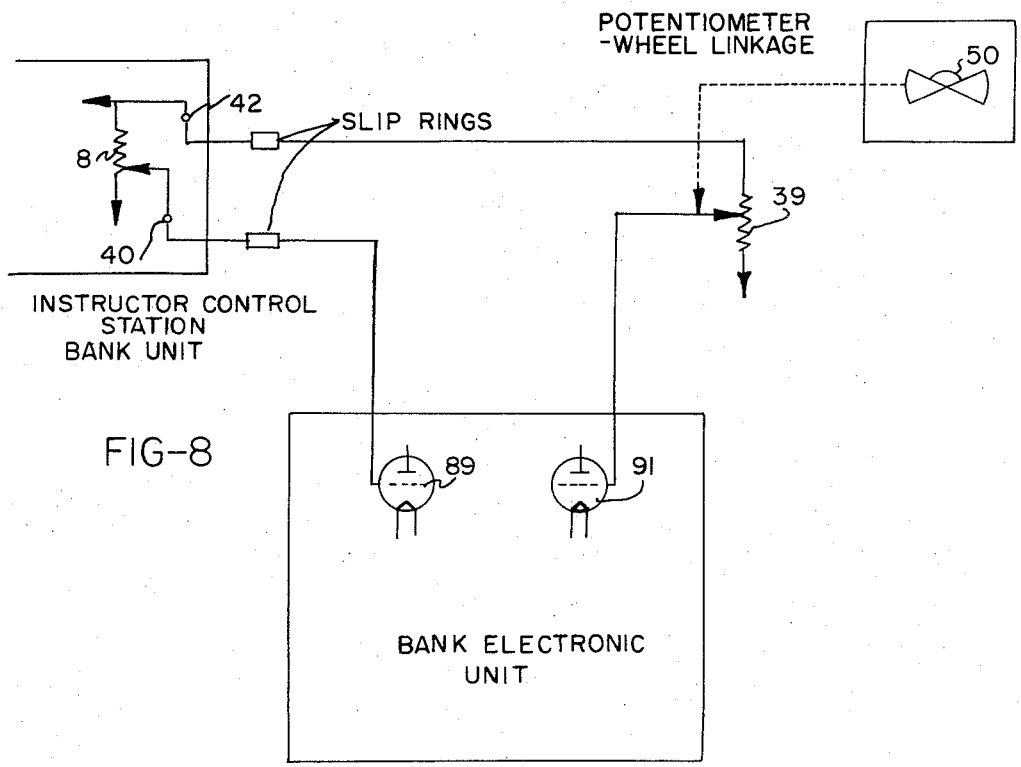
Figure 8 illustrates the relationship between the instructor control station and one electronic unit.

Referring again to Figure 1 the instructor control station is shown as connected to the pitch and bank electronic units which latter are connected to the thumb assembly. Lead 37' connects through one slip ring and a helipot to the pitch electronic unit and as already noted this arrangement will not be described in detail since it is similar to the bank electronic unit. Lead 42' from point 42 of the instructor control station connects through a slip ring and helipot 39 to the bank electronic unit as is more clearly shown in Figure 8.

The power supply (Figure 1) is also connected to the electronic units as shown and these connections are specifically referred to hereinafter.

Lead 40' connects point 40 (Figure 3) to the bank electronic unit through a slip ring while lead 38' serves a similar purpose with respect to point 38 (Figure 3) and the pitch electronic unit.

As indicated in Figure 3 the precision potentiometers 6, 8 within the control station 3 and connected to dials 5, 7 are supppplied with power through a step-up transformer 17 and a fuse 18 when switch 9 is closed, the transformer output being subsequently rectified and regulated; the copper oxide rectifiers 19, 21 effect the rectification, while voltage regulator tubes 23, 25 in combination with resistors 27, 29 and condensers 31, 33 effect voltage regulation.

The center tap of the secondary of transformer 17 is connected to ground and the ground line contains a safety feature indicated at 20; removal of either tube 23 or tube 25 breaks the circuits and puts the entire equipment out of operation. Such is desirable, though not absolutely necessary, since tubes 23, 25 in combination provide a balanced output and such output conditions are most suitable for operation of the apparatus.

Resistors 13, 15 are adjustment resistors which permit the apparatus to be balanced initially and thereafter are of use when circuit components are replaced since they permit of balancing out the slight differentials which may exist in components such as new tubes as will be understood by one skilled in the art.

The voltage output of the instructor control station is varied by the potentiometer 8 upon movement of the dial 7 and this voltage is supplied as bias to the control grid of a tube in the input of an electronic unit now to be described.

The electronic control (Figures 1, 2 and 5) comprises two units, one for pitch control and one for bank control indicated at 41 and 43, respectively (Figure 2). Referring now particularly to Fig. 2 of the bank control unit 43 the upper line of knobs 44, 45, 46 controls the deviation sensitivity, that is the degree of tolerance which an instructor may permit a student before a pulse is received by the student at the thumb. These knobs control the position of the variable resistors 47, 48, 49 (Figure 5) in the bridge circuit of the electronic unit and the clockwise rotation of the knob as shown in Figure 2 increases the allowable motion of the trainer wheel 50 before signals are received by the pilot trainee.

The lower knobs (Figure 2) designated at 51, 52, 53 control the amplitude and frequency of the pulses supplied to actuate the agitator and each is associated with the knob directly above; thus the position of knob 44 controls the point at which a signal may be applied to the agitator by the apparatus associated with knob 51.

Figure 9:
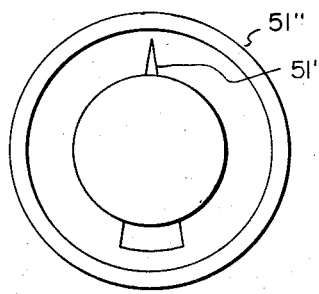
Figure 9 is an elevational view of a control knob.

The inside or bar knob 51' (Figure 9) of the lower knob controls the frequency or number of pulsations per second generated by the unit; while the outside or disc knob 51" of the unit controls the amplitude of the range of frequency covered by the associated bar knob. Pulsations in the unit vary from 7 to 100 pulses per second in three distinct ranges.

The three frequencies are obtained from (Figure 5) three plate-coupled multivibrators of conventional design shown as 55, 55', 57, 57', 59, 59'. Tubes 55, 55' define the low frequency generator and the output frequency is controlled by variation of grid resistors 61, 61' which are caused to operate simultaneously by the bar 51' on the knob 51. Actually in practice 55, 55' each constitute halves of one tube and simultaneous variation of the grid resistance yields good multi-vibrator wave forms.

The tubes defined by 57, 57', 59, 59' function similarly to 55, 55' except that they have outputs of successively higher frequencies and are controlled respectively by varying grid resistors 63, 63', 65, 65'.

Individual control of the amplitude of the output of the multi-vibrators is attained by variation in the output across the cathode resistor. In the arrangement (Figure 5) the output of each multi-vibrator is capacitively coupled to a cathode follower type amplifier which not only serves to control the amplitude but also functions to minimize interaction of the multi-vibrators themselves. Thus the tubes 67, 67' are provided with cathode resistors 69, 69', while the tubes 71, 71' have cathode resistors 73, 73'. The output voltage applied across these resistors is mixed together utilizing capacitors 74, 75, 76 as couplers, while tube 71' functions as the mixer stage. The controls on the panel of the electronic unit which permit the regulation are the discs of the lower knobs 51, 52, 53.

The output of the mixer stage in the electronic unit is is then fed, utilizing capacitance coupling to the power amplifier tubes 77, 79 which have their grids connected in parallel. Conductance of the output amplifier tube is controlled from the bridge circuit indicated generally at 81 (Figure 5) and by the micro-positioner contacts 83, 85, 87. When conducting, the output amplifier tubes 77, 79 feed the pulse signal to the thumb agitator assembly through the impedance matched transformers T1', T2'.

The voltage bias applied to tubes 89, 91, which tubes are in parallel, by the output of the instructor control station (Figure 8) governs the plate current of these tubes and the operation of the micro-positioners (Figure 5) which are the successive relays 83, 85, 87. The voltage applied to the grids of these tubes 89, 91 is a direct function of the precision potentiometer settings of the system, that is the potentiometer 8 associated with knob 7 in the instructor control and the potentiometer 39 which is the helipot (Figures 1 and 3) associated with the wheel 50.

Balance is initially accurately attained through variable resistor 90 through power from terminal board 92 and which resistor permits compensation for slight variations in the tubes 89, 91. Unbalance then in the grid voltage occasions plate current flow and operation of the first sensitive relay 83; energization of relay 83 will bring the cathode of either 77 or 79 to ground, thus causing tube conductance and an output to be applied in the thumb agitator assembly.

Still referring to the operation of the bridge circuit, increase in unbalance in the grid voltage applied to tubes 89, 91 causes the relay 85 to be energized which removes or decreases the bias on the grid of control tube 93; a still further increase of difference in the grid bias of tubes 89, 91 actuates relay 87 and the cutoff bias is removed from the grid of 93', the other half of the control tube.

As noted hereinbefore variable resistors 47, 48, 49 manipulated by the upper knobs 44, 45, 46 and the potential at which relays 83, 85, 87 energize are determined by these positioning dials, that is the deviation sensitivity controls.

The tube halves 93, 93' normally have a cutoff potential on their grids and no current then flows and consequently contacts 95, 97 are not energized; however energization of relay 85 permits sufficient plate current to flow to energize contact 95 and this permits the medium frequency generator to apply signals to the thumb agitator unit. Energization of contact 97 through conductance in tube 93' upon closure of relay 97 permits the third highest frequency generator to apply signals to the thumb agitator unit.

Figure 4:
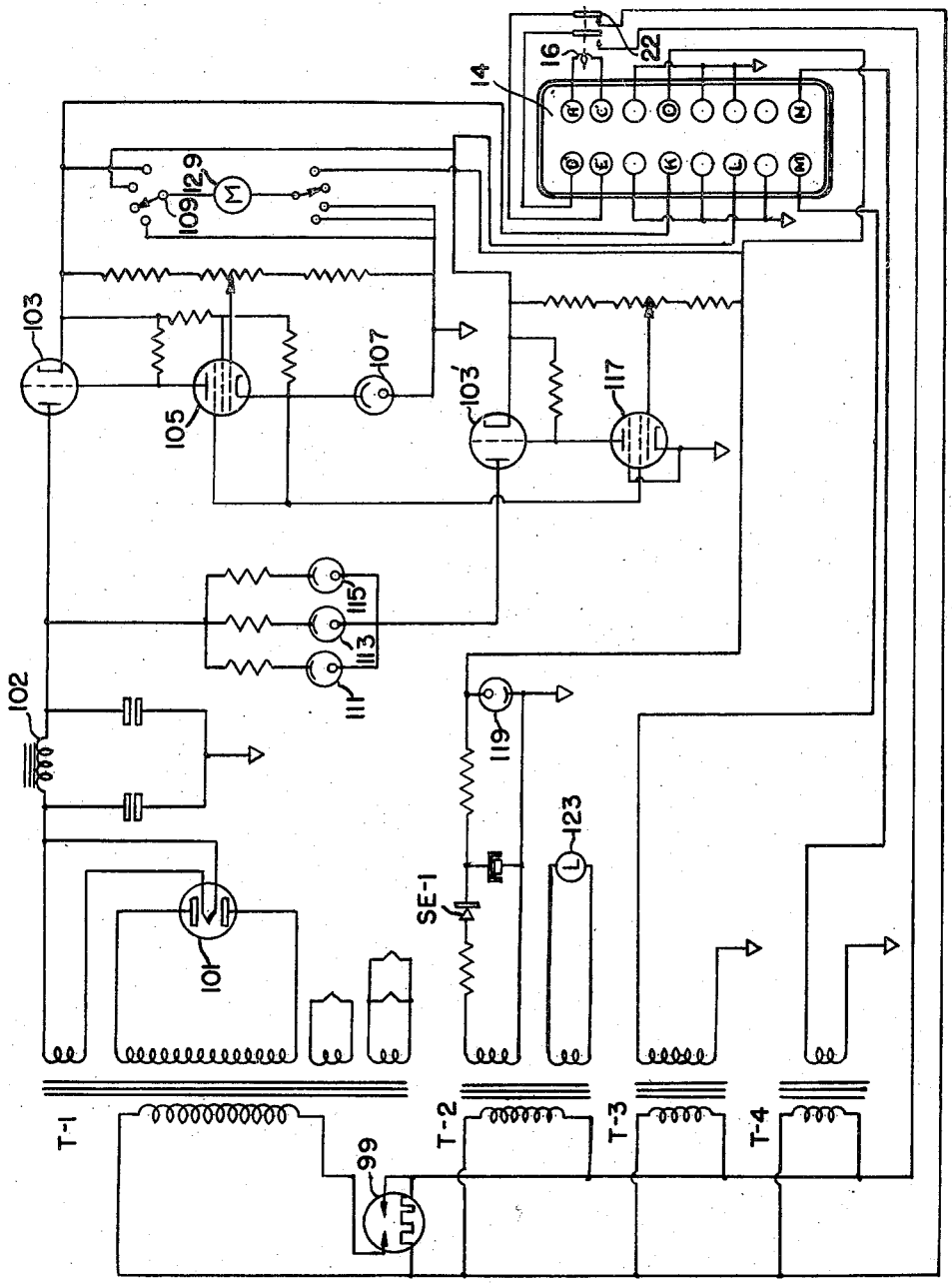
Figure 4 is a schematic diagram illustrating the circuit of the power supply of Figure 1.

The power supply illustrated in Figure 4 supplies the necessary plate, filament and bias voltages for the electronic unit. Transformer T4 provides a 6.3 volt winding and T3 a 12.6 volt winding. The low voltage circuit supplies 275 volt direct current to all components of the electronic unit except the bridge 81; the bridge (Figure 5) circuit tubes 89, 91 are supplied with regulated voltage of 400–500 direct current.

Referring to Figure 4 tube 99 provides a ten second delay before energy is applied to the main power transformer T1 the circuit of the secondary of which contains the high voltage rectifier tube 101. This latter tube supplies unregulated direct current voltage for both the high and low voltage supply through the usual filter choke indicated at 102; the series tube 103 and the regulator tube 105 and a voltage regulator tube 107, together with a conventional circuit arrangement, which it is not considered necessary to specifically describe, constitute the high voltage regulator and the voltage is measurable on meter 129 which is actuable through switch 109 (Figure 4).

The low voltage supply is similar to the high voltage supply, a single regulated circuit, but the voltage is reduced through series regulator tubes 111, 113, 115 which in conjunction with tube 103' (the other half is 103) and tube 117 form the regulator; the necessary bias for this stage is obtained through the negative power supply and a selenium type rectifier SE-1, together with voltage regulator tube 119; the switch knob 109 also permits measurement of the voltage of this low voltage circuit.

The rectifier SE-1, in addition to the above noted function, also provides the bias for power amplifier tubes 77, 79 in each of the electronic units. A dial light 123 (Figures 1 and 4) indicates the application of power to the voltage supply and is itself powered through transformer T2.

Knobs 125, 127 are provided for adjustment of voltage which is read on the meter 129; such adjustment is desirable always prior to the start of operations to insure of proper operating voltages being supplied to the tubes.

Terminal board 14 (Figure 4) and terminal board 92 (Figure 5) provide for the supplying of power to the electronic unit as schematically illustrated in Figure 1. Terminals K and K' are suitably connected to provide the plate voltage (400–500 v.) to the bridge (Figure 5); terminals L and L' are connected to provide the 275 volts direct current to all components of the electronic unit except the bridge; terminals M and M' are connected together to provide the 12.6 volt alternating current heater voltage to all tubes except 77, 79, 89 and 91; while terminals N and N' are connected together to provide the 6.3 volt alternating current voltage for these latter tubes; and terminals O and O' are connected together to provide the bias voltages for the pulse amplifiers 77, 79 and relay tubes 93, 93'. The arrows shown indicate ground connection.

Referring now to Figures 2, 6 and 7 the thumb agitator assemblies shown comprise a pair of housings 126, 128 each having two principal body portions or sections. The housings are generally similar in mechanical and electrical respects but slight differences exist in order to adapt the unit most conveniently for conveying the signals and to permit ready receipt upon various portions of the thumb. Only one housing will be described in detail as the differences in housing arrangement are immaterial to the invention.

Housing 126 (Figure 6) is in general octagonal and comprises a first body portion or section 130 and a second body portion or insert section 131. Body portion 130 is provided with a pair of parallel slots 133, 135 on one side thereof and a second pair of parallel slots 137, 139 on the side oppositely disposed to the first slots. A slit 141 somewhat narrower than slots 133, 135 passes partially therebetween.

The insert section 131 is provided with four protuberances 143 each of which is adapted to be received in a slot of housing 126; the insert section is provided with screws as at 147 and the body portion 130 is also provided with screws 149 and small coil springs 151 connect the opposed screws on the two sections together to retain the body portions in relatively slidable contact. The insert or second body portion is also formed to define a slit similar to 141 on portion 130.

Body portion of section 130, which is itself substantially in the shape of a horse-shoe, has a chamber 153 therein which chamber (Figure 7) has a movable core 155, a stationary coil 157 and the contactor or agitator 159 is fixedly secured to the core 155 for movement therewith. Thus the section 130 has only one moving part and rapid energization and de-energization of the coil results in a corresponding rapid movement of the agitator which is in the form of a plunger and adapted when energized to extend slightly out of the interior surface of the housing. A spring 161 provides for return of the movable core and housing upon removal of the pulse energy.

The insert section 131 is similarly horse-shoe shaped and provided with a second chamber 163, a movable core 165, a contactor 167, a stationary coil 169 and a spring 171 to return the contactor to a normal unenergized position on the housing.

It is to be noted that for compactness the coils 157 and 169 each have leads integral therewith, preferably simply continuations of the coils which extend through the housing as at slit 141 to the junction box 173 to be described hereinafter.

Carried on the wrist of the pilot or trainee (Figure 2) is a junction box 173 supported by bracket 175; insulated conductors extend from the box to each of the housings 126, 128. The leads are received in the slits 141 of portion 126 and a similar slot of the insert 131, and each consists of two conductors to form a complete circuit through the coils and a magnetic circuit through the cores which are energized by the current passing through the leads. A chain 181 (Figure 2) retains the various leads from the junction box in position. The signals are passed through shielded leads as at 183 (Figure 1) from a suitable connector 185 which extends to the electronic units 41, 43.

In the practice of the invention switch 9 (Figure 2) is thrown to supply power to the instructor control station and to the power supply through the slip rings (Figure 1) which latter may be regarded simply as conductors. Assuming the student to have the Link trainer in steady flight the power supply will energize the electronic unit but no signal will flow to the student. At this time, since only the bank control which is indicated by the lower circuit portion of Figure 3 is under consideration, the potentials at point 40 (connected to tube 89 through a slip ring) and point 42 (connected to tube 91 through a slip ring and potentiometer 39) will be equal and accordingly no voltage difference exists between the grids of tubes 89, 91. The potential at 42 is dependent on the position of the arm of potentiometer 39 which is governed by the position of wheel 50. Thus referring briefly to Figure 8 control wheel 50 is associated with the potentiometer 39 and the potentiometer 39 has one end thereof connected to an end of potentiometer 8; the potentiometer 39 may be suitably carried on the shaft of wheel 50 and turning of the wheel 50 then effects the governing of the position of the arm of potentiometer 39.

When the instructor then turns the knob 7 slightly the condition of potentiometer 8 (Figure 3) is altered and an unbalance of potential exists between point 40 which is connected to the moving arm of potentiometer 8 and the point 42, and the same potential difference exists between the grids of tubes 89, 91 and current flows to cause actuation of relay 83 (Figure 5). The point at which relay 83 becomes operative is also controllable by the instructor through knob 44 which as noted hereinbefore controls the position of variable resistor 47.

Upsetting the bridge balance causes pulses to be generated as already described and the agitator 159, for example, is set into operation to indicate to the student that the course must be altered, i. e. the wheel 50 turned. Turning the wheel 50 in the proper direction so moves the arm of potentiometer 39 as to bring the point 42 and the point 40 back to the same potential thus balancing the grid voltages of tubes 89, 91 and de-energizing the relay 83.

Should the student err and move the wheel 50 in the improper direction the degree of unbalance between points 40, 42 increases, thus increasing the difference in grid voltage of tubes 89, 91 and causing relay 85 to be actuated which brings the second multi-vibrator section into play to increase the vibration frequency of shaft 159 and to automatically warn the pilot of his excessive deviation and turning error. The second multi-vibrator section and even the third which functions upon a yet greater degree of unbalance may also be occasioned by the instructor initially if desired; although such is not usual training practice.

Should the instructor reverse the rotation of knob 7 from the balanced condition the bridge would simply be unbalanced in the opposite direction and the right hand agitator 167 (Figure 7) would be actuated in a manner similar to that already described.

Since the housing 126 may be so worn that the agitators strike opposed portions of the thumb, the agitator striking the right hand fleshy portion of the thumb will induce a leftward movement of wheel 50 while the converse applies to agitator 159 and the left hand portion of the thumb.

There has thus been described a novel, convenient and compact agitator and a system for training control which is adaptable to aircraft and which provide features which induce the automatic response of a trainee or a pilot to deviations from a prescribed course.

It will be understood that this invention is susceptible to modification in order to adopt it to different usages and conditions and accordingly, it is desired to comprehend such modifications within this invention as may fall within the scope of the appended claims.

We claim:

1. A thumb assembly comprising a housing having in opposed relation a body portion and an insert section which are relatively slidable, the said body portion and insert section each having a thumb agitator shaft in the form of a plunger and adapted to extend into a hollow of the housing, the said hollow being constructed and arranged to receive therein a human thumb to be contacted on opposed sides by the agitators.

2. A thumb assembly comprising a body portion and an insert section which are relatively slidable and which define a central hollow adapted to receive therein a human thumb, each of said body portion and insert section having a thumb agitator in the form of a plunger and which agitators are adapted to extend into the hollow from opposed sides thereof, and means to selectively to actuate one said agitator to cause the same to oscillate into and out of said hollow to repetitively strike a thumb when the same is in the hollow.

3. A thumb assembly comprising a body portion and an insert section which are relatively slidable and which define a central hollow adapted to receive therein a human thumb, each of said body portion and insert section having a thumb agitator in the form of a plunger and which agitators are adapted to extend into the hollow from opposed sides thereof, coil means in each of the body and insert portions surrounding a thumb agitator, each of said coil means having a lead extending externally of the assembly, and junction box means to be worn on the wrist of a pilot connected to said assembly by said extending leads.

4. In a compact thumb unit for the receipt of signals a housing comprising a substantially horse-shoe shaped body portion having slots therein, a substantially horse-shoe shaped insert portion having fingers extending into the slots, means resiliently securing the body portion and insert portion together for relative sliding movement, said body portion and insert portion defining a hollow for the receipt of a thumb and which hollow is variable with the relative sliding of said portions, a thumb agitator in the form of a shaft plunger mounted for reciprocable movement in said body portion, and another thumb agitator also in the form of a shaft plunger mounted in the insert portion for reciprocable movement and disposed in opposite relation to the first of the thumb agitators, said thumb agitators being adapted to extend into the hollow of the housing in their reciprocation.

5. In an arrangement for signaling to an operator a deviation from a predetermined plan, means to derive an electrical potential from a said deviation, bridge circuit means adapted to be unbalanced by the application of said potential thereto, a multi-vibrator, means to derive an output of a given frequency from said multi-vibrator upon unbalance of said bridge circuit, a thumb unit having a hollow for the receipt therein of a thumb of an operator, said unit having an agitator for contacting a thumb in the hollow, and means responsive to the output of the multi-vibrator to cause repetitive actuation of the agitator.

6. In an arrangement for signaling to an operator the degree of deviation from a predetermined plan, means to derive an electrical potential the value of which is dependent upon the degree of deviation, bridge circuit means adapted to be unbalanced by the application of said potential thereto, the unbalance increasing with the potential, multi-vibrator means responsive to unbalance in the bridge, means to derive signals of varying frequency from the multi-vibrator means in response to varying degrees of unbalance in the bridge, a thumb unit having a hollow for the receipt of a thumb of an operator and also having an agitator for contacting a thumb in the hollow, and means responsive to the output of the multi-vibrator to cause repetitive actuation of the agitator at frequencies varying in accordance with multi-vibrator output.

7. In an arrangement for signaling to an operator the degree of deviation from a predetermined plan, a pair of potentiometers, one of which is under the control of an operator, a bridge circuit including a pair of parallel connected amplifier tubes, the bias of one being controlled by one potentiometer and the bias of the other by the other potentiometer, means to balance the bridge in a given relative position of the potentiometer and to derive an output signal from the bridge in other relative positions of the potentiometers, a multi-vibrator operable upon unbalance of the bridge to supply a signal, a thumb unit having a hollow for receipt of a thumb of an operator and also having an agitator actuable upon a signal output from the multi-vibrator to strike the thumb of the operator, the potentiometer under control of the operator being operable to restore the balance to the bridge and to de-actuate the agitator.

References Cited in the file of this patent

UNITED STATES PATENTS

| | | |
|---|---|---|
| 1,881,878 | Nidy | Oct. 11, 1932 |
| 2,455,274 | Scriver | Nov. 30, 1948 |
| 2,657,476 | Holcombe | Nov. 3, 1953 |
| 2,682,042 | Harcum | June 22, 1954 |
| 2,717,459 | Holcombe | Sept. 13, 1955 |
| 2,754,505 | Kenyon | July 10, 1956 |

FOREIGN PATENTS

| | | |
|---|---|---|
| 310,264 | Germany | Jan. 4, 1919 |
| 352,070 | Germany | Apr. 22, 1922 |